(12) United States Patent
Lemmons et al.

(10) Patent No.: US 11,843,808 B2
(45) Date of Patent: Dec. 12, 2023

(54) METHODS AND SYSTEMS FOR CONTENT MANAGEMENT

(71) Applicant: Comcast Cable Communications, LLC, Philadelphia, PA (US)

(72) Inventors: Chris David Lemmons, Denver, CO (US); Michael Melcher, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/139,577

(22) Filed: Dec. 31, 2020

(65) Prior Publication Data

US 2022/0210490 A1 Jun. 30, 2022

(51) Int. Cl.
*H04N 21/234* (2011.01)
*H04N 21/231* (2011.01)
*H04N 21/845* (2011.01)
*H04N 21/24* (2011.01)

(52) U.S. Cl.
CPC . *H04N 21/23418* (2013.01); *H04N 21/23113* (2013.01); *H04N 21/2407* (2013.01); *H04N 21/8456* (2013.01)

(58) Field of Classification Search
CPC ....... H04N 21/23418; H04N 21/23113; H04N 21/2407; H04N 21/8456
See application file for complete search history.

(56) References Cited

U.S. PATENT DOCUMENTS

| | | | | |
|---|---|---|---|---|
| 2003/0018980 | A1* | 1/2003 | Gorbatov | H04N 21/235 725/133 |
| 2004/0034873 | A1* | 2/2004 | Zenoni | H04N 21/4345 725/135 |
| 2006/0200842 | A1* | 9/2006 | Chapman | H04N 21/4882 725/34 |
| 2014/0149533 | A1* | 5/2014 | Bergman | H04L 67/2842 709/213 |
| 2015/0040176 | A1* | 2/2015 | Hybertson | H04N 21/812 725/131 |
| 2016/0066042 | A1* | 3/2016 | Dimov | H04N 21/4667 725/34 |
| 2017/0326430 | A1* | 11/2017 | Phillip | G06Q 30/02 |
| 2019/0191218 | A1* | 6/2019 | Cormican | H04N 21/4622 |
| 2020/0068228 | A1* | 2/2020 | Abramov | H04N 21/4223 |

\* cited by examiner

*Primary Examiner* — Kyu Chae
(74) *Attorney, Agent, or Firm* — Ballard Spahr LLP

(57) ABSTRACT

Methods, systems, and apparatus are described herein for analyzing content if an interruption occurs during an output of content so as to synchronize a playback point of the output of content to a live point of the output of content. An output of content may be interrupted for any number of reasons, and during the interruption period, the content may be selectively stored.

20 Claims, 10 Drawing Sheets

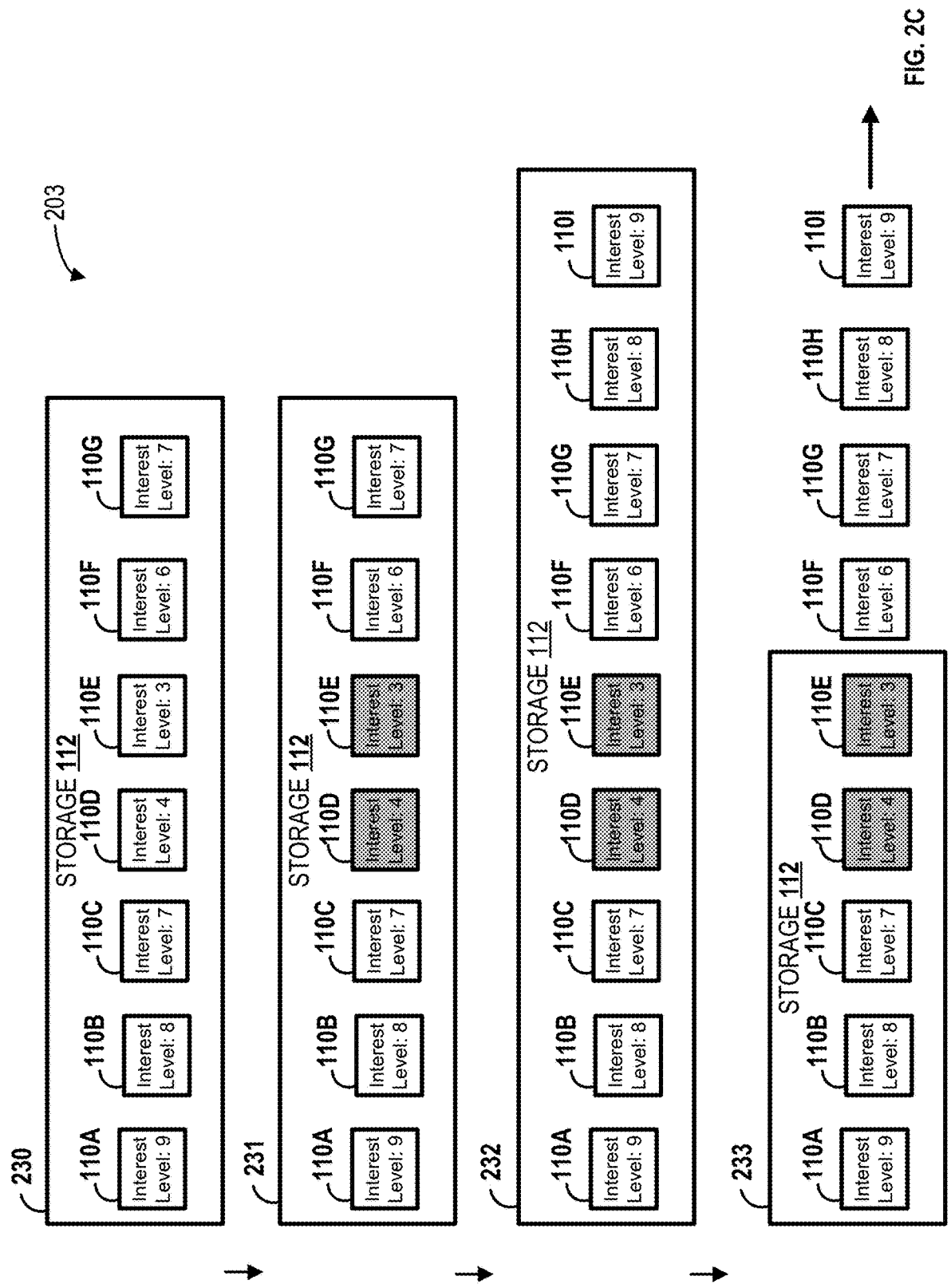

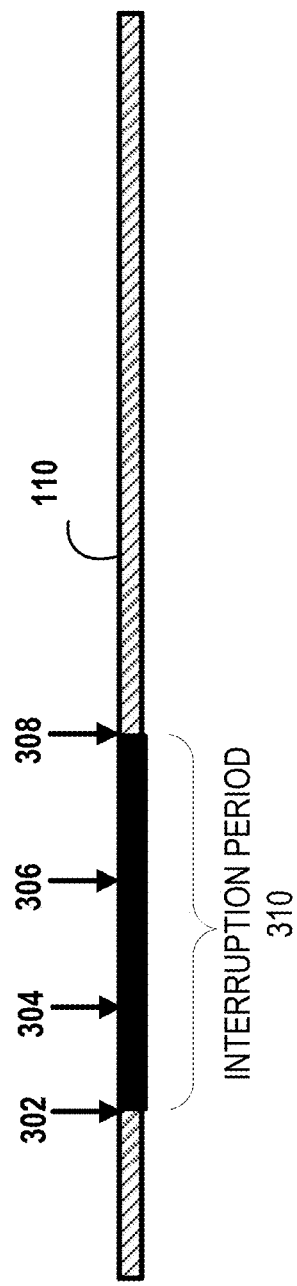

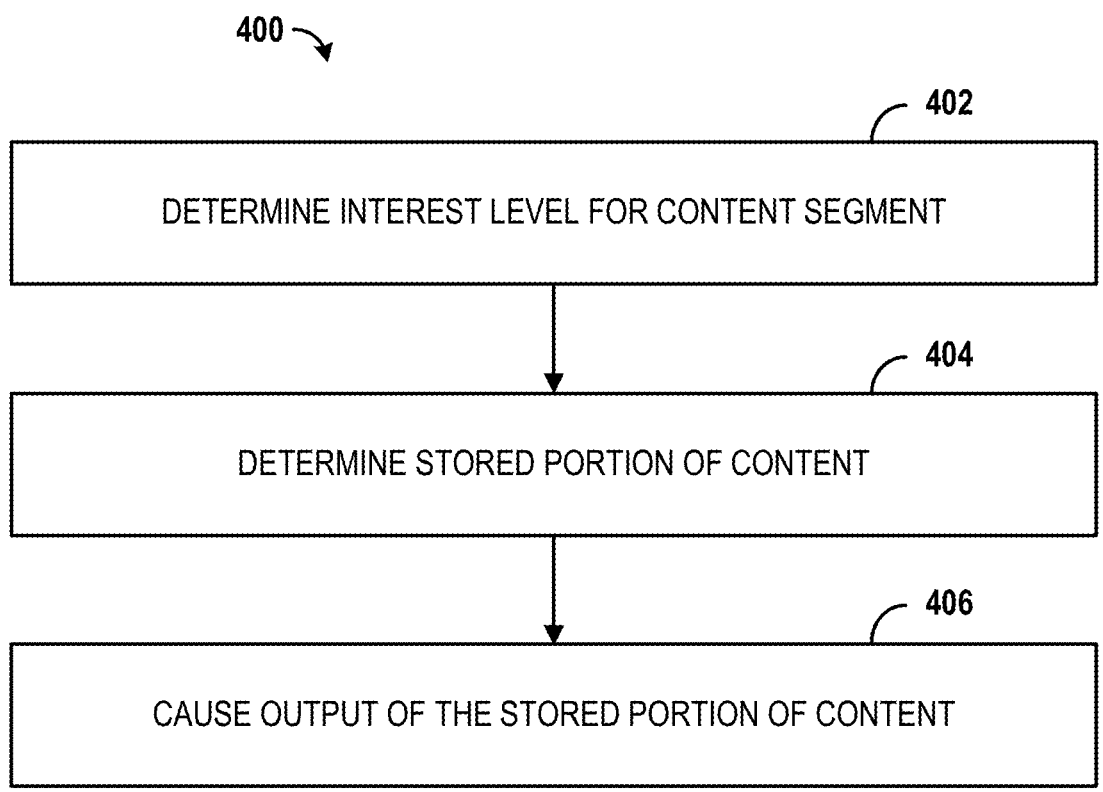

METHODS AND SYSTEMS FOR CONTENT MANAGEMENT

BACKGROUND

If a time delay for live content is introduced, for example, through use of a replay, full screen commentary, an advertisement, or other interruption, it is important to get the viewer back to the live point of the content as expeditiously as possible to maintain the viewer experience. Typical approaches to this problem include simply skipping a portion of the content without consideration of what is being skipped. These approaches ignore the potential significance of the portion of the content being skipped and therefore, the user may miss important parts of the content. This detracts from the user experience.

SUMMARY

It is to be understood that both the following general description and the following detailed description is merely an example and is explanatory only and is not restrictive. Methods, systems, and apparatuses for analyzing and storing content are described. In the course of delivering content to a user or device, an interruption event may occur. In order to return the content to a live point, certain content segments may need to be skipped (e.g., not output). However, skipping content segments may result in not outputting content segments that a user would want outputted and/or to view. Thus, certain content segments may be identified as comprising content which may be more interesting to the user. Likewise, other content segments may be identified as containing content which may be less interesting to a user. In order to return the user to the live point, the content segments containing content that is less interesting may be skipped (e.g., not output to the user or device).

BRIEF DESCRIPTION OF THE DRAWINGS

The accompanying drawings, which are incorporated in and constitute a part of this specification, illustrate embodiments and together with the description, serve to explain the principles:

FIGS. 2A-2D are block diagrams of an example buffer scheme;

FIG. 3 shows an example output of content;

FIG. 4 is a flow chart of an example method;

DETAILED DESCRIPTION

Figure 1:
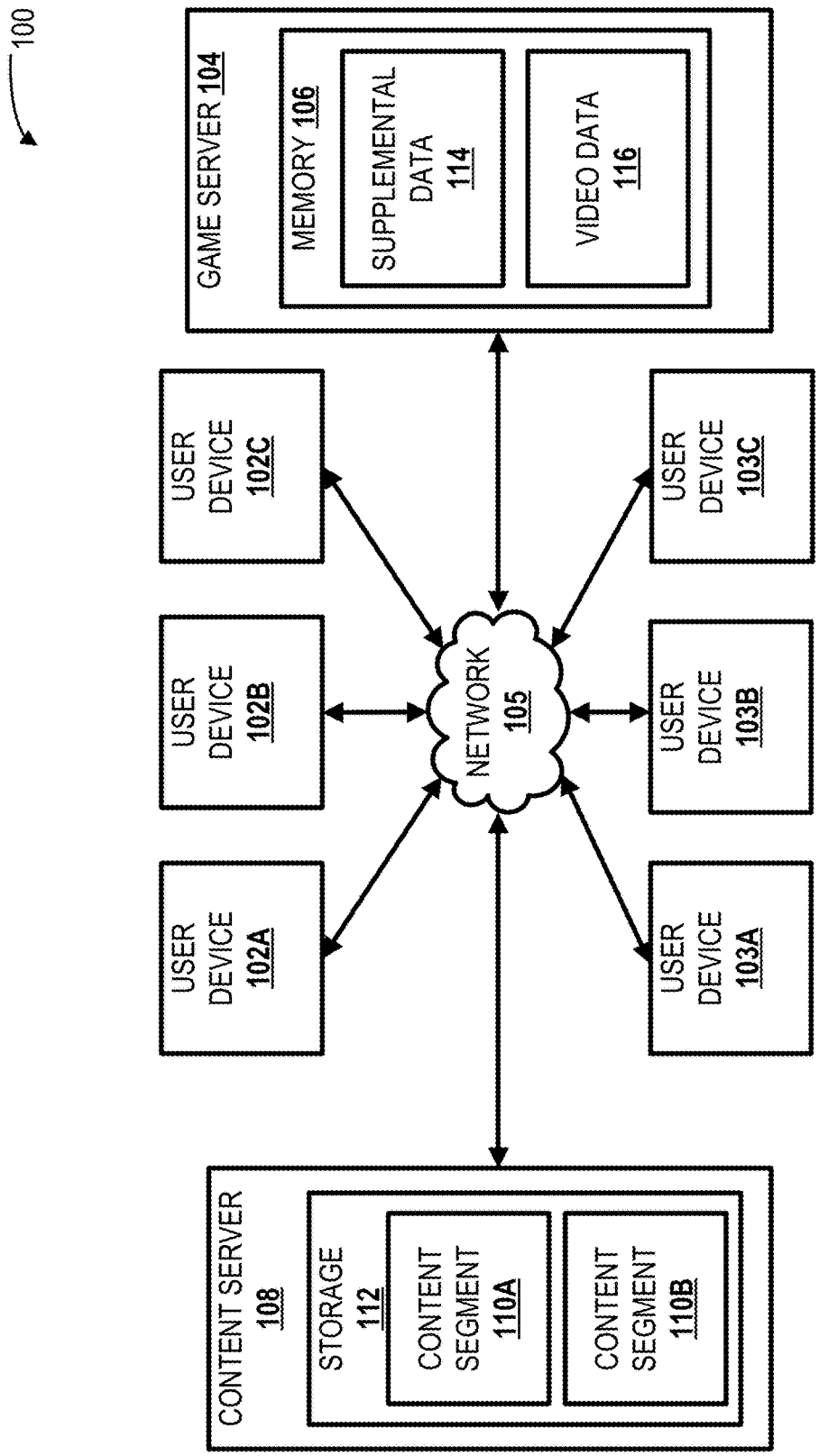
FIG. 1 is a block diagram of an example system and network.

Before the present content storing techniques are disclosed and described, it is to be understood that this disclosure is not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" or "example" means "an example of" and is not intended to convey an indication of a preferred or ideal embodiment. "Such as" is not used in a restrictive sense, but for explanatory purposes.

Disclosed are components that can be used to perform the disclosed content analysis and storage techniques. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present content analysis and storage techniques may be understood more readily by reference to the following detailed description of preferred embodiments and the examples included therein and to the Figures and their previous and following description.

As will be appreciated by one skilled in the art, the content analysis and storage techniques may take the form of an entirely hardware embodiment, an entirely software embodiment, or an embodiment combining software and hardware aspects. Furthermore, the content analysis and storage techniques may take the form of a computer program product on a computer-readable storage medium having computer-readable program instructions (e.g., computer software) embodied in the storage medium. More particularly, the present content analysis and storage techniques may take the form of web-implemented computer software. Any suitable computer-readable storage medium may be utilized including hard disks, CD-ROMs, optical storage devices, or magnetic storage devices.

Embodiments of the content analysis and storage techniques are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 shows an example system 100 in which the present disclosure may operate. One skilled in the art will appreciate that provided herein is a functional description and that the respective functions can be performed by software, hardware, or a combination of software and hardware. The system 100 may facilitate content distribution. The content may comprise any media such as an e-sports game, a traditional sporting event, a public address (for example, the State of the Union), a video clip, a television episode, a movie, streaming content, on-demand content, combinations thereof, and the like. The content may comprise one or more content segments (e.g., fragments, portions, fractions, etc.). The system 100 may comprise a first plurality of user devices 102A-C in communication with a computing device, such as game server 104. For example, each user device of the first plurality of user devices 102A-C may be a computing device such as a computer, gaming console, smart phone, camera, server, or any other device capable of generating or outputting data (e.g., the content). The first plurality of user devices 102A-C may be in communication with the game server 104 through a network 105. Each user device of the first plurality of user devices 102A-C may send and receive data to and from the game server 104. Likewise, the game server 104 may be any computing device which may receive, process, distribute, and/or output data. For example, the game server 104 may receive data from the first plurality of user device 102A-C, process the data, and output the video data, audio data, supplemental data, and the like. The game server 104 may be configured to output one or more content segments. For example, during the course of game play, a player may enter a command (e.g., by pressing a button on a controller) which may cause a character to perform a game action (as described further below). Data associated with the game action may be sent from the user device 102A to the game server 104 and the game server 104 may further distribute the data. For example, the game server 104 may relay the game action to the other user devices 102B and 102C, and may send the data to the content server 108. Sending the data may comprise sending the one or more content segments. Sending the data may comprise sending one or more content streams. For example, the game server 104 may send the one or more one or more content segments to a content server 108 through the network 105. The content server 108 may be configured to receive the content. The content server 108 may comprise storage 112. The storage 112 may comprise any storage means as described herein. For example, the storage 112 may comprise a buffer. In the course of sending/distributing content, the one or more content segments may be stored in the storage 112 (e.g., the one or more content segments may be "buffered"). The storage 112 may comprise a physical memory storage which may be used to store the one or more content segments (e.g., content segment 110A and/or content segment 110B). The storage 112 may be a device which is separate from the content server 108. The one or more content segments may be stored automatically, or in response to an interruption event as described further herein.

The content (e.g., the one or more content segments) may be sent by/from the game server 104 to the content server 108. The one or more content segments may be associated with the one or more data streams. A data stream of the one or more data streams may be output by the game server 104 and may be associated with video data (e.g., video data 116) and another data steam of the one or more data streams may be associated with supplemental data (e.g., supplemental data 114). The video data 116 may comprise image and/or audio data associated with the content. For example, the video data 116 may comprise image and/or audio data to be output via a display device. For example, the video data 116 may represent what a viewer may see on the display device, whether it be a player at a gaming console or a viewer viewing the content on, for example, a monitor at an e-sports arena or a television at home. Each of the supplemental data 114 and the video data 116 may comprise, among other things, timing information. The timing information may be used to synchronize the supplemental data 114 and the video data 116. The supplemental data 114 may comprise data associated with the content. The supplemental data 114 may comprise mathematical data. For example, the supplemental data may describe a relationship between two objects, such as a distance or vector. The supplemental data 114 may be determined based on the one or more data streams sent between, for example the user device 102A and the game server 104.

In the context of e-sports or online gaming, the supplemental data 114 may comprise information associated with game actions, game statistics, game information, combinations thereof, and the like. For example, game actions may comprise damage done, healing applied, movement actions taken, offensive actions taken, offensive actions blocked, game abilities activated or deactivated, actions taken by characters in response to a button press, actions such as moving an avatar, causing damage, healing, throwing a ball or object, shooting a gun, character spawning, combinations thereof, and the like.

Game statistics may comprise a game score, a number players participating, health information, hit-points, fatigue, damage, a rolling sum of damage done within a time period, a rolling sum of hitpoints accumulated or lost within the time period, a sum of total number of characters in a field of view (e.g., how many other players can a single player see in the single player's field of view), combinations thereof, and the like.

Game information may comprise information related to game play such as a distance between players, a number of players in a field of view, proximity to map hazards or other players, character data (e.g., minimum speed, maximum speed, minimum and maximum attack values or ability to withstand damage), an average distance from a character to another character, nearest distance between two characters during a time period, farthest distance between two characters during a time period, minimum and maximum speeds of a character, a character "levelling up," obtaining or losing a particular game resource, combinations thereof, and the like. For example, the supplemental data 114 may indicate the locations and trajectories of various characters. The locations and trajectories of the various characters may be analyzed so as to determine a likelihood that the various characters will interact, or that they are currently interacting. For example, if the supplemental data 114 related to the locations and trajectories of two characters during the given content segment indicates that two characters have only a twenty percent chance of interacting during the given content segment, the given content segment may be labeled with an interest level of 20. However, if the supplemental data 114 related to the locations and trajectories of two characters during the given content segment indicates that the two characters are currently interacting (e.g., doing battle, executing a scoring drive, escaping a trap), the given content segment associated may be labeled with an interest level of 100 (e.g., there is a 100% chance the two characters are interacting). Although the foregoing example suggests a 1:1 correlation between game information and interest level, the person skilled in the art will understand that this example is not limiting and that any relationship between game information and the interest level may be implemented.

In the context of streaming or on-demand content (e.g., movies or television shows), the supplemental data 114 may comprise content information. Content information may comprise for example, action data (high action scenes in a movie, important plot points in a television episode, scoring plays in a real-like sporting event, highlight plays, combinations thereof, and the like). For example, in a non-gaming context, the supplemental data 114 may be associated with a high action scene. The action data may be determined by any means such as optical flow analysis, histogram analysis, motion tracking techniques, or other techniques as are known in the art. Likewise, in the sporting context, high action plays or important plays may be determined by known methods such as artificial intelligence or other means. The aforementioned examples are merely explanatory and are not restrictive.

The supplemental data 114 may be used to determine an interest level associated with a given content segment of the one or more content segments. The interest level may reflect a measure of how interesting the given content segment may be to a viewer. Accordingly, a content segment associated with a relatively high interest level may be of more interest to a viewer, whereas a content segment associated with a relatively low interest level may be of less interest to a viewer.

For example, the interest level of a content segment may be determined based on the game actions. For example, a number of game actions executed during a given content segment or over a period of time may be determined. For example, if in the given content segment, 8 game actions are executed, the given content segment may be labeled with an interest level of 8. Likewise, if during the given content segment, only 3 game actions are executed, the given content segment may be labeled with an interest level of 3. Although the foregoing example suggests a 1:1 correlation between game actions and interest level, a person skilled in the art will understand that this example is not limiting and that any relationship between game actions and the interest level may be implemented.

For example, the interest level of the given content segment may be determined based on the game statistics. For example, if the supplemental data 114 associated with the given content segment indicates that 80 hitpoints of damage were done during the given content segment, the given content segment may be labeled with an interest level of 80. Likewise, if the supplemental data 114 associated with the given content segment indicates 30 hitpoints of damage were done during the given content segment, the given content segment may be labeled with an interest level of 30. Although the foregoing example suggests a 1:1 correlation between game statistics and interest level, the person skilled in the art will understand that this example is not limiting and that any relationship between game statistics and the interest level may be implemented.

The interest level of a given content segment may be related to an interest level threshold. For example, a content segment associated with an interest level that satisfies the interest level threshold may be associated with important events or sequences of actions, for example an attack during an e-sports contest, a scoring play during a traditional sporting event, or an action-packed scene during a movie. Likewise, a content segment associated with an interest level that does not satisfy the interest level threshold may be a content segment having little to no important events or sequences of actions such as attacking or defensive maneuvers during an e-sports contents, no scoring plays during a traditional sporting event, or a boring monologue during a movie.

The interest level and its relationship to the interest level threshold may be used to determine whether the given content segment is stored in the storage 112. A computing device may determine the interest level associated with the given content segment prior to or contemporaneously with storing the given content segment. For example, any content segment associated with an interest level that satisfies the interest level threshold may be stored and any content segment associated with an interest level that does not satisfy the interest level threshold may not be stored. For example, content segment 110A may be associated with an interest level which satisfies the interest level threshold. The content segment 110A may be labeled to indicate that the content segment 110A should be maintained in the storage 112. Likewise, the content segment 110B may be determined to be associated with an interest level which does not satisfy the interest level threshold. As such, content segment 110B may not be stored in the storage 112 in the first instance.

Likewise, the interest level and its relationship to the interest level threshold may be used to determine whether the given content segment is output from the storage 112 and ultimately the content server 108. A computing device may determine the interest level associated with the given content segment prior to or contemporaneously with outputting the given content segment. For example, any content segment associated with an interest level that satisfies the interest level threshold may be output and any content segment associated with an interest level that does not satisfy the interest level threshold may not be output. For example, content segment 110A may be associated with an interest level which satisfies the interest level threshold. The content segment 110A may be labeled to indicate that the content segment 110A should be output from in the storage 112 to, for example, user device 103A. Likewise, the content segment 110B may be determined to be associated with an interest level which does not satisfy the interest level threshold. As such, content segment 110B may not be output to user device 103A.

The computing device may store each content segment as the one or more content segments are received. The interest level may be used to determine a label associated with a content segment. The interest level and label may be used to determine that the content segment should be removed from the storage 112. The computing device may determine the interest level associated with each stored content segment, and remove content segments associated with an interest level that does not satisfy the interest level threshold. The label may comprise metadata associated with the content segment. Such metadata may be stored in the content segment with which it is associated or, stored in a manifest associated with the one or more content segments. The label may indicate an action to be taken with respect to the content segment. For example, the label may indicate the content segment should be stored, or "maintained" in the storage 112 or the label may indicate the content segment should be "dropped" from the storage 112. For example, the content segment 110A may be labeled to indicate the content segment 110A should be maintained in the storage 112. Likewise, the content segment 110B may be labeled to indicate the content segment 110B is associated with an interest level which does not satisfy the interest level threshold and thus is labeled that is should be "dropped" from the storage 112.

The content server 108 may output the one or more content segments to a second plurality of user devices 103A-C. The one or more content segments can be sent to the second plurality of user devices 103A-C from the storage 112. The interest level may be used to determine whether or not to output the content segment. For example, a content segment may be associated with a label indicating the content segment is to be either "output" or "skipped" during output of the content segments in the buffer such that the content segment is not output. For example, the content segment 110A may be labeled to indicate that content segment 110A should be output upon output of the content segments from the storage 112. Likewise, the content segment 110B may be maintained in the storage 112, but labeled as being eligible to "skipped" upon output of the content segments from the storage 112.

The interest level may be used to indicate a label to be read by a user device that receives the content segment. For example, the content segment may be associated with an interest level that fails to satisfy the interest level threshold. The user device (e.g., the user device 103A) that requests content from the content server 108 may receive the content segment associated with the interest level that fails to satisfy the threshold and determine, based on the label, to not display that content segment. For example, the content server 108 may send the content segments from the storage 112 to any user device of the second plurality of user devices 103A. The user device 103A may be configured to read the label and "skip" content segment 110B upon display of the content.

Distributing the one or more content segments as described herein may comprise an output of content. The content may comprise a playback point and a live point. The playback point may be associated with a segment of the content currently being output. The live-point may be current content (e.g., content which has not been time-delayed). For example, the timing information may be used to synchronize the playback point and the live-point. The output of content may experience an interruption event. The one or more content segments may be stored based on the interruption event. The interruption event may set back the playback point of the content to a point which is earlier in time than the live-point. The interruption event may be, for example, a video interruption and/or a network interruption. The video interruption may be, for example, a replay event such as a game-winning attack in a videogame (e.g., showing previous content or alternate content such as color commentary), a scoring drive in a football game, a user replay, a commentary, an Amber Alert, an Emergency Alert System (EAS) alert, breaking news, a political address, combinations thereof, and the like. The network interruption may be, for example, a service interruption, a hardware failure, combinations thereof, and the like. Upon an end of the interruption event, the content segments in the buffer may be output so as to return the playback point to the live point.

Referring back to components of the system 100, the network 105 may comprise any telecommunications network such as the Internet or a local area network. Other forms of communications can be used such as wired or wireless telecommunication channels, for example. The network 105 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. As a particular example, the network 105 can comprise a cellular network. One of skill in the art will appreciate that the game server 104 may be any server suitable for processing content. The game server 104 may be any computing device (e.g., any server) configured to process supplemental data 114 (as described below). As an example, the game server 104 can comprise a memory 106.

Figure 2A:
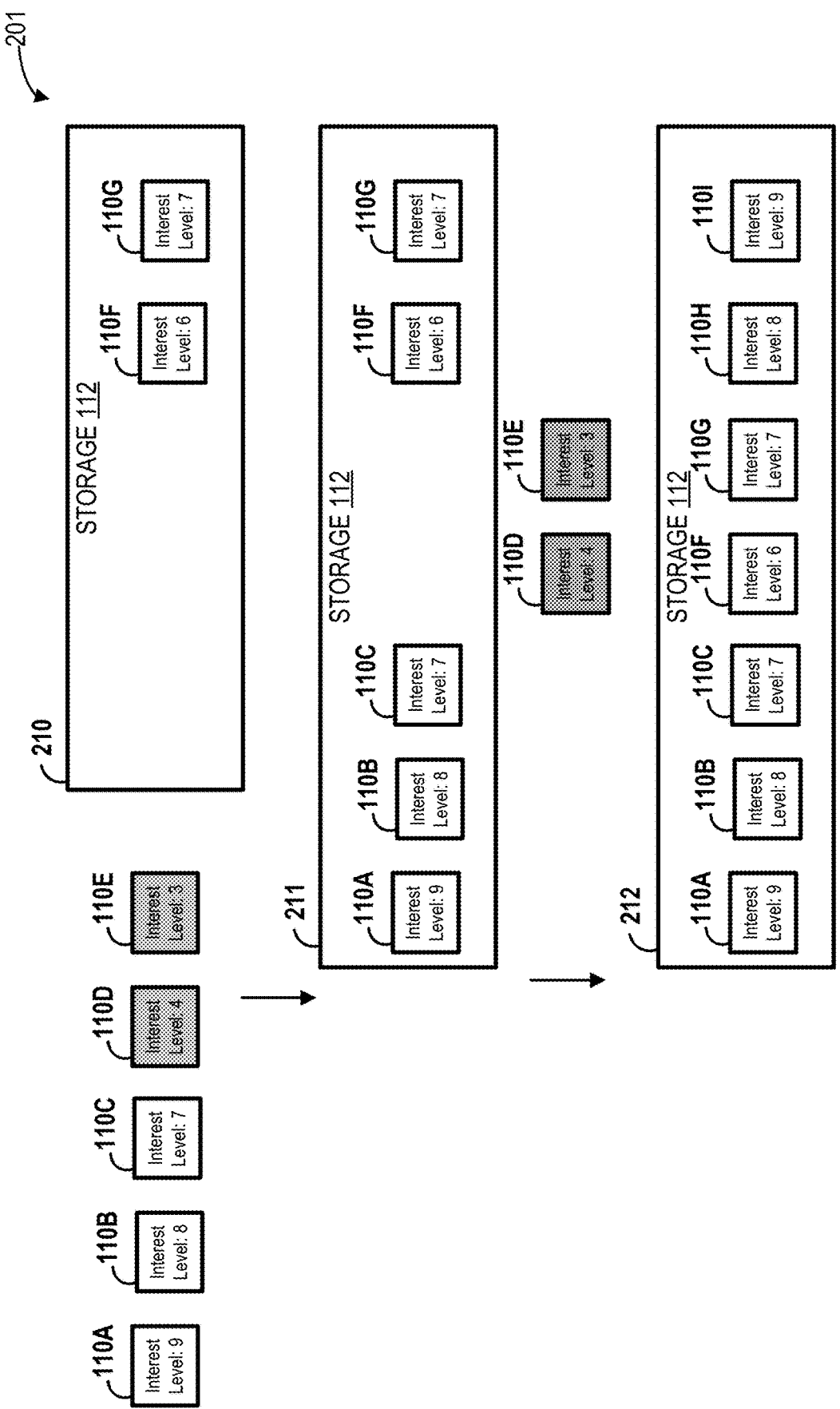

FIG. 2A shows an example content analysis and storage scheme 201. The storage 112 may comprise any suitable storage means. The storage 112 may comprise a physical memory storage which may be used to store the one or more content segments. In FIG. 2A, a plurality of content segments 110A-I are shown. The plurality of content segments 110A-I may collectively be referred to as the one or more content segments. It is to be understood that this is merely an example and any number of content segments may be stored in the storage 112 at any given time. The content server 108 may receive the one or more content segments from the game server 104. The content server 108 may determine the interest level associated with each of the one or more content segments upon receipt. For example, at 210, the content segment 110D and the content segment 110E are determined to be associated with interest levels (e.g., 4 and 3, respectively), which do not satisfy the interest level threshold. The content server 108 may label each of the one or more content segments. For example, the content server 108 may label the content segment 110D and the content segment 110E as being associated with interest levels that do not satisfy the interest level threshold (shaded). For example, the content segments 110A-C may be labeled as being associated with interest levels that do satisfy the interest level threshold (shown un-shaded). The label may indicate that the content segment is to be stored in the storage 112. The label may indicate that the content segment is not to be stored in the storage 112. For example, at 211 the content segment 110D is not stored in the storage 112. Also, the content segment 110E is not stored in the storage 112. However, the content segments 110A-C and 110F-G are stored in the storage 112. Thus, at 212, only content segments associated with interest levels that satisfy the threshold are stored in the storage 112.

Figure 2B:
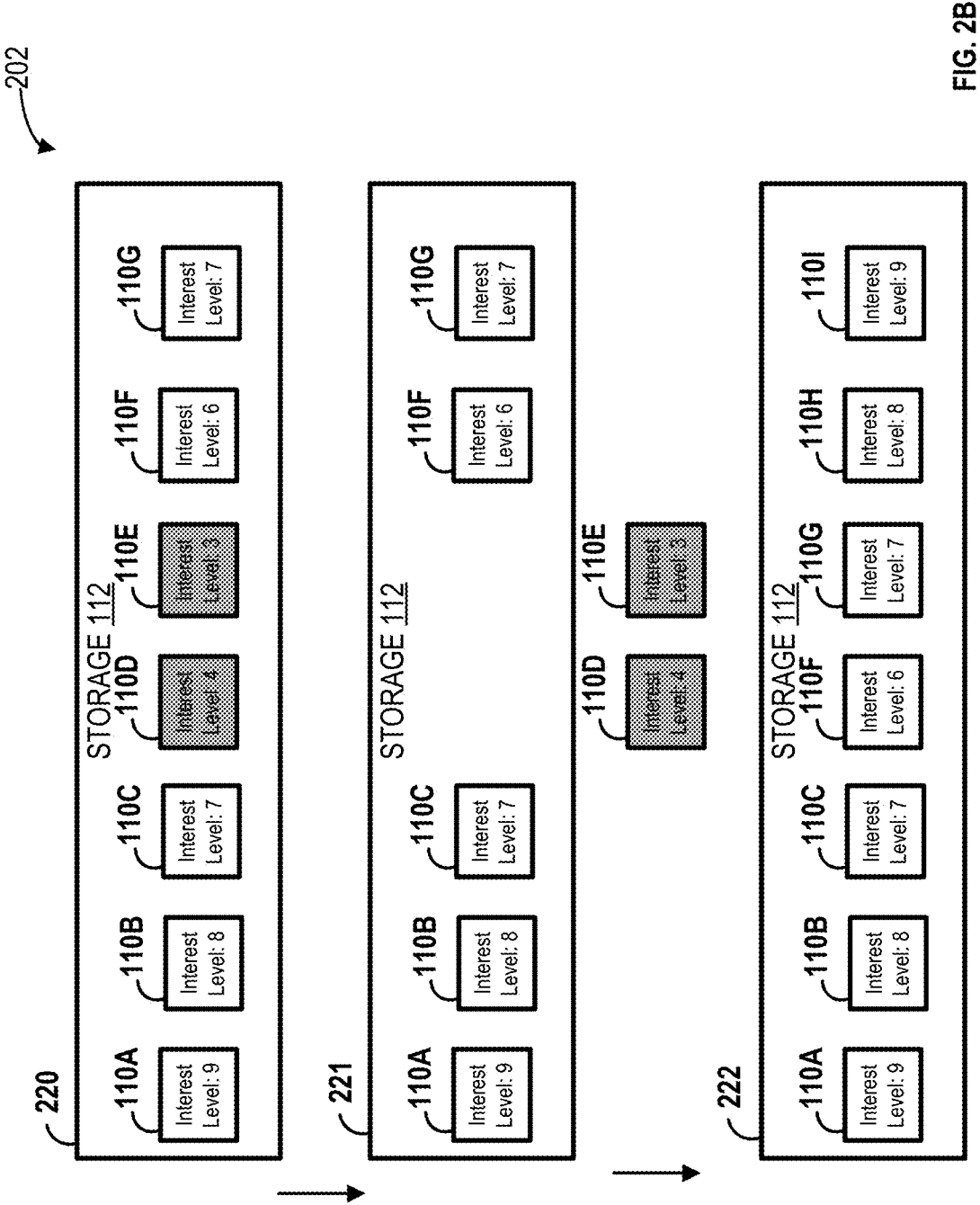

FIG. 2B shows an example content analysis and storage scheme 202. The storage 112 may comprise any suitable storage means. The storage 112 may comprise a physical memory storage which may be used to store the one or more content segments. In FIG. 2B, a plurality of content segments 110A-I are shown. The plurality of content segments 110A-I may collectively be referred to as the one or more content segments. It is to be understood that this is merely an example and any number of content segments may be stored in the storage 112 at any given time. The content server 108 may receive the one or more content segments from the game server 104. At 221, the content server 108 may determine the interest level associated with each of the one or more content segments upon receipt (e.g., while the one or more content segments are in the storage 112). The content server 108 may label of the one or more content segments. The label may indicate if the content segment is associated with an interest level that satisfies the interest level threshold. The label may indicate that the content segment is associated with an interest level that does not satisfy the interest level threshold. The label may indicate that the content segment is to be maintained (unshaded) in the storage 112 or dropped (shaded) from the storage 112. For example, the content segment 110D may be associated with an interest level (e.g., 4) that does not satisfy the interest level threshold. The content segment 110D may be labeled (for clarity, shown in gray) to indicate the content segment 110D is to be dropped from the storage 112. Also, the content segment 110E may be associated with an interest level (e.g., 3) that does not satisfy the interest level threshold. The content segment 110E may be labeled (shown in gray) to indicate the content segment 110E is to be dropped from the storage 112. As such, at 221, the content segment 110D and the content segment 110E, after entering the storage 112, are removed from the storage 112. Therefore, at 222, only content segments associated with interest levels that satisfy the interest level threshold are maintained in the storage 112.

The one or more content segments that are not removed from the storage 112 can be output to the second plurality of user devices 103A-C (e.g., a television, a monitor, a mobile device, a tablet, a smart phone, a smart watch, a wearable device, a vehicle, a display device, combinations thereof, and the like). In an embodiment, the user device 103A (or any other user device) may not fetch the content segment associated with the interest level which does not satisfy the interest level threshold.

FIG. 2C shows an example content analysis and storage scheme 203. The storage 112 may comprise any suitable storage means. The storage 112 may comprise a physical memory storage which may be used to store the one or more content segments. In FIG. 2C, a plurality of content segments 110A-I are shown. The plurality of content segments 110A-I may collectively be referred to as the one or more content segments. It is to be understood that this is merely an example and any number of content segments may be stored in the storage 112 at any given time. The content server 108 may receive the one or more content segments from the game server 104. At 230, the content server 108 may determine the interest level associated with each of the one or more content segments while the one or more content segments are stored in the storage 112 (e.g., while the one or more content segments are in the storage 112). At 231, the content server 108 may label each of the one or more content segments. The label may indicate if the content segment is associated with an interest level that satisfies the interest level threshold. The label may indicate that the content segment is associated with an interest level that does not satisfy the interest level threshold. The label may indicate that the content segment is to be output from the storage 112 or not output from the storage 112 and removed at a later time. For example, at 230, the content segment 110A is associated with an interest level of 9 while the content segment 110D is associated with an interest level of 4. The content server 108 may determine an interest level threshold hold of 5. For example, the content server 108 may determine that the respective interest levels associated with content segments 110A, 110B, 110C, 110F and 110G satisfy the interest level threshold. The content server 108 may determine that the interest levels associated with content segments 110D and 110E fail to satisfy the interest level threshold. The content server, at 233, for example, may only output content segments that are associated with interest levels that satisfy the interest level threshold (e.g., the content segments 110F, 110G, 110H, and 110I) while the content segments whose associated interest levels do not satisfy the interest level threshold, in this case, the content segment 110D and the content segment 110E, thus content segments 110D and 110E may not be output.

Figure 2D:
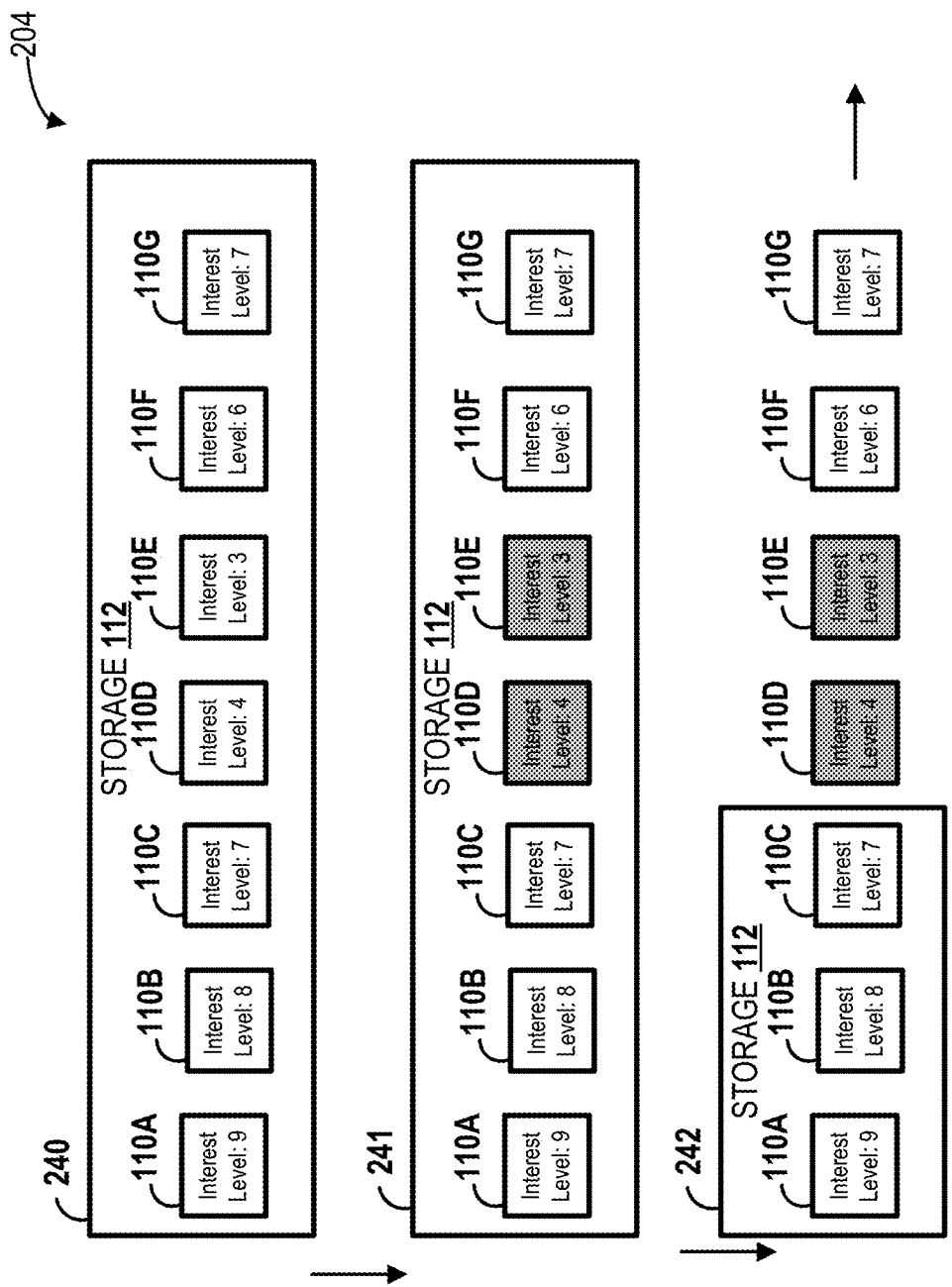

FIG. 2D shows an example content analysis and storage scheme 204. The storage 112 may comprise any suitable storage means. The storage 112 may comprise a physical memory storage which may be used to store the one or more content segments. In FIG. 2D, a plurality of content segments 110A-I are shown. The plurality of content segments 110A-I may collectively be referred to as the one or more content segments. It is to be understood that this is merely an example and any number of content segments may be stored in the storage 112 at any given time. The content server 108 may receive the one or more content segments from the game server 104. At 240, the content server 108 may determine the interest level associated with each of the one or more content segments while the one or more content segments are stored in the storage 112. At 241, the content server 108 may label of the one or more content segments. The label may indicate if the content segment is associated with an interest level that satisfies the interest level threshold. The label may indicate that the content segment is associated with an interest level that does not satisfy the interest level threshold. The label may indicate that a user device (e.g., the user device 103A) is to display the content segment. The label may indicate that the user device 103A is to not display the content segment. For example, the content server 108 may determine the content segment 110D is associated with an interest level that does not satisfy the interest level threshold. Similarly, the content server 108 may determine the content segment 110E is associated with an interest level that does not satisfy the interest level threshold. The content server 108 may label the content segment 110D and the content segment 110E as content segments that should be "skipped" by the user device 103A upon display of the content. In the example buffer scheme 204, at 241 and 242 content segments 110D and 110E are shown in gray to indicate those content segments are to be skipped. At 242, The content server 108 may output content segments associated with interest levels that satisfy the interest level threshold (e.g., the content segments 110F and 110G) as well content segments that are associated with interest levels that do not satisfy the interest level threshold (e.g., the content segments 110D and 110E). The user device 103A (or any other user device) may identify the content segments to be skipped (e.g., the content segment 110D and the content segment 110E) and may not display the content associated with those content segments.

FIG. 3 shows an example process flow for determining an interruption point 302 and returning a playback point 304 of an event (e.g., a content broadcast) to a live-point 306. The content stream may comprise a video stream and/or an audio stream. The interruption point 302 may be determined to occur during output of the one or more content segments. The interruption point 302 may be associated with timing information. The timing information may mark a clock-time or a point in the output of content at which the interruption event occurred and thus indicate the interruption point 302. The interruption point 302 may be determined based on an interruption in the output of content for any reason, for example, to initiate an instant replay or break for commercials. The interruption may cause the one or more content segments to be stored in the storage 112. The one or more content segments may continue to be generated even after the interruption point 302. For example, during an e-sports match, it may be determined that an instant replay is desirable and thus, while the action continues in the e-sports game (e.g., the live-point 306 continues to move forward in time), the playback point 304 is set to a point in the one or more content segments that trails the one or more content segments containing the live-point 306. The interruption point 302 may mark the start of an interruption period 310. The interruption period 310 may represent a duration of time where the playback point 304 trails the live-point 306. The interruption point 302 may be a point in time at which the playback point 304 of the one or more content segments trails the live-point 306. During this period, the one or more content segments may be stored in the storage 112. As the buffer receives the one or more content segments 110, the content server 108 (e.g., the storage 112) may determine the interest level associated each of the one or more content segments.

During the interruption period, it may be determined that, in order to synchronize the playback point 304 and the live-point 306, any of the methodologies described in FIGS. 2A-2D may employed until the playback point 304 and the live-point 306 are the same point in time (e.g., a resume point 308).

The one or more content segments may be associated with a manifest. For example, the manifest may comprise an identifier and metadata associated with each of the one or more content segments. The metadata may relate to the interest level. The manifest may be sent to any of the one or more user devices 103A-C. Based on the manifest, the identifier, and the metadata (e.g., interest level), any of the one or more user devices 103A-C, for example, the user device 103A may determine a content segment to display and/or a content segment to skip. For example, the user device 103A may display only content segments associated with interest levels that satisfy the interest level threshold.

FIG. 4 shows an example method 400, executing on one or more of the devices of FIG. 1. For example, the game server 104 may receive inputs from the one or more user devices 102A-C participating in a game. The inputs may comprise, for example, game commands which cause a game action such as the firing of a weapon, the throwing of a ball, or any other game action as described herein. The game server 104 may determine/generate, based on the inputs, content (e.g., video data) and/or data (e.g., supplemental data). The content may comprise one or more content segments. The game server 104 may send the content and the data to the content server 108. The data and/or the content may be included in one or more data streams. For example the game server 104 may send the content and the data to the content server 108 via the one or more data streams. The one or more data streams, for example, may comprise an audio stream and/or a video stream (e.g., a data stream). The content server 108 may receive the content and the data.

At step 402, an interest level for each segment of the one or more content segments associated with an output of content may be determined. For example, the interest level may be determined in response to an interruption event. For example, during the course of receiving the inputs, and/or generating or sending the data, the interruption event may occur. The interruption event may be associated with an output of content. The interruption event may occur at a first position in the output of content. The first position in the output of content may not necessarily be a beginning of the output of content, but rather may be any point in the output of content. The interruption event may be associated with timing information. The interruption event may include, but is not limited to, video interruptions (e.g., replay events, commentary, Amber Alerts, Emergency Alert System (EAS), content triggers (e.g., a noteworthy event/action occurring in video content such as a game-winning attack in League of Legends®), breaking news, political addresses, etc.), and network interruptions (e.g., service interruption, hardware failure, etc.). The interruption event may be associated with an output of one or more content segments. For example, the one or more content segments may comprise an event such as sporting event (e.g., e-sports, baseball, football, etc. . . . ), a public address, a concert, and or any other content. For example, the interruption event may comprise one or more of a replay of a portion of the output of content or a delay in storing the output of content. The interruption event may be associated with timing information wherein the timing information indicates a point in the output of content at which the interruption event occurred (e.g., the interruption point 302). For example, during an e-sports contest, it may be determined that an action warranting replay has occurred. If such a determination is made, the output of the one or more content segments may be interrupted at a first position in the output of content (e.g., the interruption point 302) and the time from the beginning of the e-sports contest may be determined, for example 5 minutes and 10 seconds into the contest. A second position in the output of content may be determined. The second position in the output of content may comprise the resume point 308. The resume point 308 may be associated with the live-point 306. In other words, the resume point 308 may represent the point in time at which the playback point and the live-point 306 may be synchronized. It may be determined that the difference in time between the first position and the second position may or may not satisfy a threshold maximum quantity of time. In the case that the difference in time between the interruption point 302 and the live-point 306 is less than the length of time of one of the one or more content segments, it may be determined that none of the one or more content segments need to be dropped from the storage 112. For example, if it is determined that the difference between the first position and the second position exceeds the threshold maximum amount of time, the content between the first position and the second position may be dropped from the storage 112 and not output to the user device 102. The interruption event may comprise a pause in a in the generation or sending of the one or more content segments. For example, the interruption event may comprise a pause in a content stream. The interruption event may be associated with a change in view. For example, at an interruption point, the video data may comprise a feed from a camera or a view from one player's perspective. However, at the resume point, the video data may comprise a different view from a different camera or a view from a different player's perspective. The interruption event may be associated with a replay of a portion of the output of content. The interruption event may be associated with an interruption period 310. The interruption period 310 may represent the difference in time between the first position (e.g., the start of the interruption event) and a second position (e.g. the resumption of live action). The interruption period 310 may be associated with a change in view. For example, at the interruption point 302, the video data may comprise a feed from the camera or a view from one player's perspective. However, at the resume point 308, the video data may comprise a different from a different camera or a view from a different player's perspective. Further, the interruption event may be associated with a delay in storing the output of content.

For each of the one or more content segments 110, the interest level for the segment can be determined. The interest level may be determined based on the content and/or the data. For example, if two characters are located at a distance and their respective trajectories indicate the two trajectories will not intersect, a likelihood that the two characters will not interact can be determined and thus the segment may be associated with an interest level that does not satisfy the interest level threshold. Likewise, if the trajectories of two characters indicate their paths will cross, a high likelihood that the two characters will interact may be determined and thus, that content segment may be associated with an interest level that satisfies the interest level threshold.

For each, or at least one, of the one or more content segments, the interest level for the segment can be determined. One skilled in the art can appreciate that the interest level can be determined based on any data related to the content including, but not limited to distance between players, number of players in a field of view, damage done, healing applied, movement actions taken, offensive actions taken, offensive actions blocked, proximity to map hazards or other players, game abilities activated or deactivated, health information, actions taken by characters in response to a button press and other game information and the like. It may be determined whether the interest level of any of the one or more content segments falls below, satisfies, or exceeds a threshold interest level.

At step 404, a stored portion of content may be determined. The stored portion of content may comprise one or more content segments. The stored portion of content may be determined based on the interest level for any one of the one or more content segments. Determining the stored portion of content may comprise determining, based on the interest level for the one or more content segments 110, that game data satisfies the interest level threshold. The stored portion of content may be associated with an interruption period 310. The stored portion of content may be associated with a difference between a current live position of the output of content and an end position of the stored portion of the output of content. The difference may be less than or equal to a maximum quantity of time. The maximum quantity of time may be based on a storage capacity of the storage 112 and the size of the one or more content segments.

The stored portion of content may be determined based on the one or more content segments satisfying or not satisfying an interest level threshold. For example, if a given content segment of the one or more content segments is determined to be associated with an interest level which falls below the interest level threshold, that content segment may be associated with an interest level which does not satisfy the interest level threshold. The content segment associated with the interest level that does not satisfy the interest level threshold may not be stored in the storage 112, may be removed from the storage 112, may not be output from the storage 112, or may be output from the storage 112 with a label or instructions for the receiving user device to not display that content segment. For example, as described with reference to FIG. 2A, a content segment received by the content server 108 may be labeled as satisfying the interest level threshold. The content server 108 may determine, based on the label that the content segment is to be maintained in the storage. Similarly, a content segment received by the content server 108 may be labeled as not satisfying the interest level threshold and therefore, the content server 108 may determine, based on the label that the content segment is not to be maintained in the storage and thus never enters the storage 112.

For example, as described with reference to FIG. 2B, the one or more content segments may be stored in the storage 112, wherein it may be determined that a first content segment is associated with an interest level which satisfies the interest level threshold while a second content segment is determined to be associated with an interest level that does not satisfy the interest level threshold. The content server 108 may execute a function to remove the second content segment (that does not satisfy the interest level threshold) from the storage 112.

For example, as described with reference to FIG. 2C, the content server 108 may determine a first content segment that is associated with an interest level that satisfies the interest level threshold. This first content segment may be designated for output (for example, to the user device 103A). Meanwhile, the content server 108 may determine a second content segment that is associated with an interest level that fails to satisfy the interest level threshold. This second content segment may be designated as a content segment which is not to be output to a user device (e.g., the user device 103A).

For example, as described with reference to FIG. 2D, the content server 108 may label a content segment associated with an interest level that satisfies the interest level with an instruction to be received and read by a user device (e.g., the user device 103A) that instructs the user device to display (e.g., "play") the content segment. Likewise, the content server 108 may label a content segment associated with an interest level that fails to satisfy the interest level with an instruction to be received and read by a user device (e.g., the user device 103A) that instructs the user device to not display (e.g., "skip") the content segment.

Determining the stored portion of content may comprise determining timing information associated with the output of content. For example, timing information associated with the interruption event may be determined. The timing information associated with the interruption event may comprise an interruption start time (e.g., interruption point 302) and an interruption end time (e.g., the resume point 308). Thus, the interruption period 310 may be determined. Determining the stored portion of content may comprise determining a number of the one or more content segments to store in the storage 112 or to drop from the storage 112 so as to return the viewer to the live-point 306. The one or more content segments may comprise content segments of a given length or amount of data. For example, each of the one or more content segments may comprise the supplemental data 114 and video data 116 for approximately 5 seconds of game play. Accordingly, the number of content segments stored in the storage 112 may be associated with the timing information and the size of each of the one or more content segments to be stored. The stored portion of content may comprise the one or more content segments generated and/or sent between the interruption point 302, the current live-point 306 of the output of content, and/or the resume point 308. It may be determined that the interruption event occurred at a first position. The interruption period 310 may comprise a pause in the generation or sending of the one or more content segments.

Determining the stored portion of content may comprise determining the interest level for any given segment of the one or more content segments. For example, if the interest level for the given segment of the one or more content segments falls below the interest level threshold, that segment may be dropped from the storage 112 and thus not constitute the stored portion of the content. Determining the stored portion of the content may be based on a storage capacity of storage 112.

At step 406, the system 100 may cause output of the stored portion of content. Causing output of the stored portion of content may comprise outputting one or more content segments. For example, a content segment associated with the interest level that satisfies the interest level threshold may be maintained in the storage 112 and output to the second plurality of user devices 103A-C upon resuming the output of content. Outputting the stored portion of content may comprise transmitting the one or more content segments to the second plurality of user devices 103A-C. The user device can be, for example, a television, a monitor, a mobile device, a tablet, a smart phone, a smart watch, a wearable device, a vehicle, a display device, combinations thereof, etc. Causing output of the stored portion of content may be based on a termination of the interruption event.

Figure 5:
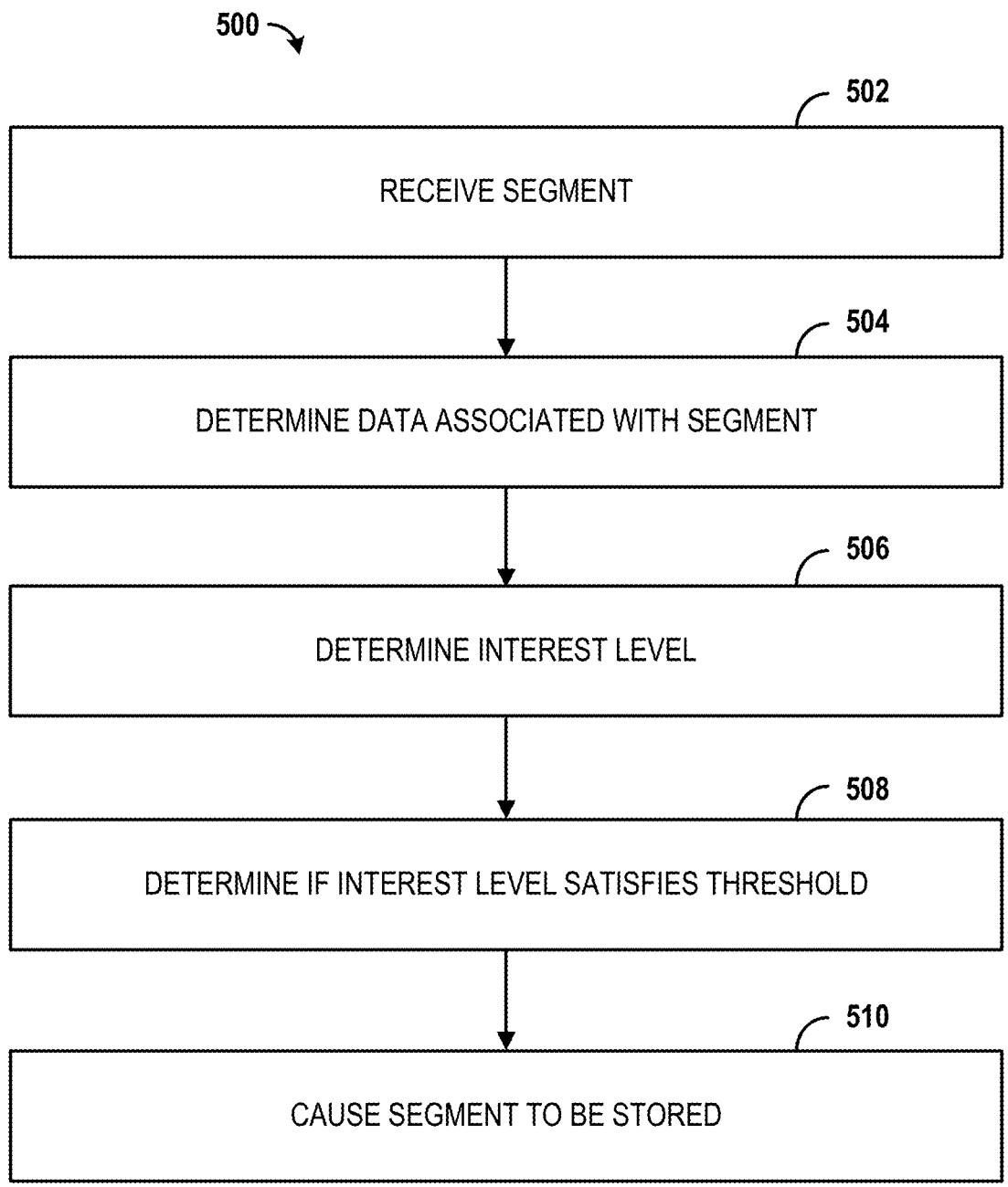
FIG. 5 is a flow chart of an example method.

FIG. 5 shows an example method 500, executing on one or more of the devices of FIG. 1. At step 502, a content segment of a plurality of content segments may be received. The content segment may be received via the network 105. The network 105 may comprise a wired or wireless network. The network 105 may comprise a cellular network. The content segment may be stored in a storage medium (e.g., storage 112).

At step 504, data (e.g., supplemental data) associated with each content segment of the plurality of content segments may be determined. The data may be sent to a computing device (e.g., the content serve 108). The data may comprise game actions, game statics, game information, content information, combinations thereof, and the like associated with the content segment. For example, the game statistics may comprise, hitpoints, attack points, damage, scores, or the like or combinations thereof as described herein.

At step 506, an interest level for a content segment of one or more content segments may be determined. The interest level for the content segment can be determined based the data associated with the content segment as described herein. The interest level for any given content segment of the one or more content segments may be determined based on the supplemental data 114 and/or the video data 116. For example, the locations and trajectories of various characters may be analyzed so as to determine a likelihood that the various characters will interact. For example, if two characters are located at a distance and their respective trajectories indicate the two trajectories will not intersect, a likelihood that the two characters will not interact can be determined thus the content segment of the one or more content segments may be associated with an interest level that does not satisfy the interest level threshold. Likewise, if the trajectories of two characters indicate their paths will cross, a high likelihood that the two characters will interact may be determined and thus, the content segment of the one or more content segments may be associated with an interest level that satisfies the interest level threshold. For example, if, in a given content segment of the one or more content segments it is determined that two characters are likely to interact or are interacting, that content segment can be associated with an interest level that satisfies the interest level threshold. One skilled in the art can appreciate that the interest level can be determined based on any data related to the content including, but not limited to distance between players, number of players in a field of view, damage done, healing applied, movement actions taken, offensive actions taken, offensive actions blocked, proximity to map hazards or other players, game abilities activated or deactivated, health information, actions taken by characters in response to a button press and other game information and the like.

At step 508, an interest level associated with the content segment may be determined to satisfy an interest level threshold. It may be determined whether the interest level of any of the one or more segments falls below, satisfies, or exceeds the interest level threshold.

At step 510, the content segment may be caused to be stored. The determination as to whether the content segment is stored may comprise determining whether or not the interest level of the content segment satisfies the interest level threshold. The content segment associated with the interest level that does not satisfy the interest level threshold may not be stored in the storage 112, may be removed from the storage 112, may not be output from the storage 112, or may be output from the storage 112 with a label or instructions for the receiving user device to not display that content segment. For example, as described with reference to FIG. 2A, a content segment received by the content server 108 may be labeled as satisfying the interest level threshold. The content server 108 may determine, based on the label that the content segment is to be maintained in the storage. Similarly, a content segment received by the content server 108 may be labeled as not satisfying the interest level threshold and therefore, the content server 108 may determine, based on the label that the content segment is not to be maintained in the storage and thus never enters the storage 112.

For example, as described with reference to FIG. 2B, the one or more content segments may be stored in the storage 112, wherein it may be determined that a first content segment is associated with an interest level which satisfies the interest level threshold while a second content segment is determined to be associated with an interest level that does not satisfy the interest level threshold. The content server 108 may execute a function to remove the second content segment (that does not satisfy the interest level threshold) from the storage 112.

For example, as described with reference to FIG. 2C, the content server 108 may determine a first content segment that is associated with an interest level that satisfies the interest level threshold. This first content segment may be designated for output (for example, to the user device 103A). Meanwhile, the content server 108 may determine a second content segment that is associated with an interest level that fails to satisfy the interest level threshold. This second content segment may be designated as a content segment which is not to be output to a user device (e.g., the user device 103A).

For example, as described with reference to FIG. 2D, the content server 108 may label a content segment associated with an interest level that satisfies the interest level with an instruction to be received and read by a user device (e.g., the user device 103A) that instructs the user device to display (e.g., "play") the content segment. Likewise, the content server 108 may label a content segment associated with an interest level that fails to satisfy the interest level with an instruction to be received and read by a user device (e.g., the user device 103A) that instructs the user device to not display (e.g., "skip") the content segment.

The determination as to whether the content segment is to be stored may comprise determining whether or not the size of the content segment exceeds a size threshold associated with the storage 112. The size threshold associated with the storage 112 may be based on a storage capacity of the storage 112, a network heuristic, or some other characteristic.

Further, an interruption event may be determined. The interruption event may occur at a first position in the output of content. A difference between a current live position of the output of content and an end position of the stored portion of the content may be determined. Further, the difference may be less than or equal to a maximum quantity of time.

Figure 6:
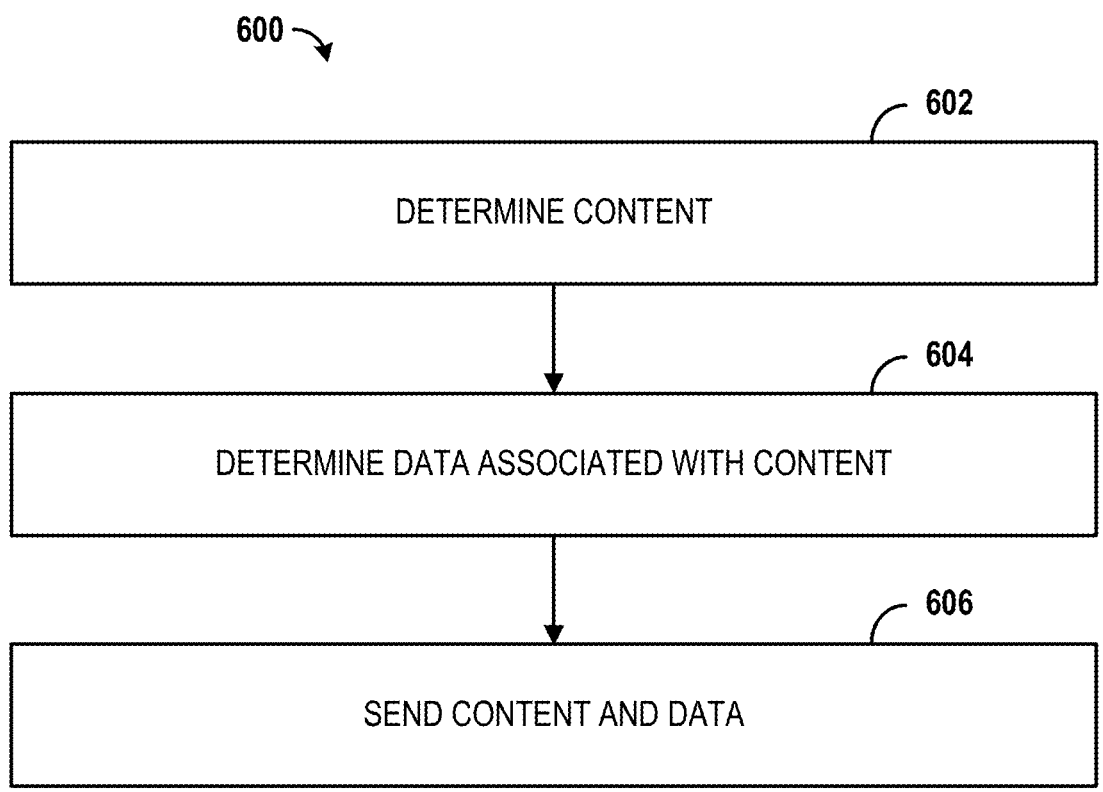
FIG. 6 is a flow chart of an example method.

FIG. 6 shows an example method 600, executing on one or more of the devices of FIG. 1. At step 602, content associated with a game may be determined. The content may comprise the video data 116. The content may comprise image and/audio data to be output via a display device. For example, the content may represent what a viewer may see on the display device, whether it be a player at a gaming console or a viewer viewing the content on, for example, a monitor at an e-sports arena or a television at home.

At step 604, data associated with the content may be determined. The data may comprise the supplemental data 114. The data may comprise at least one of game information, game actions, or game statistics, or content information. The game information may comprise information related to game play such as a distance between players, a number of players in a field of view, proximity to map hazards or other players, character data (e.g., minimum speed, maximum speed, minimum and maximum attack values or ability to withstand damage), an average distance from a character to another character, nearest distance between two characters during a time period, farthest distance between two characters during a time period, minimum and maximum speeds of a character, a character "levelling up," obtaining or losing a particular game resource, combinations thereof, and the like. The game actions may comprise damage done, healing applied, movement actions taken, offensive actions taken, offensive actions blocked, game abilities activated or deactivated, actions taken by characters in response to a button press, actions such as moving an avatar, causing damage, healing, throwing a ball or object, shooting a gun, character spawning, combinations thereof, and the like. The game statistics may comprise, for example, hitpoints, attack points, damage, scores, or the like or combinations thereof as described herein. The data may comprise content information. Content information may comprise for example, action data (scoring plays, highlight plays, high action scenes in a movie, and important plot points in television, combinations thereof, and the like). For example, in a non-gaming context, the data may be associated with a high action scene. The action data may be determined by any means such as optical flow analysis, histogram analysis, motion tracking techniques, or other techniques as are known in the art. The data may be configured to cause a determination of one or more interest levels for each of one or more content segments. For example, an interest level for the a content segment of the one or more content segments can be based on an analysis of the locations and trajectories of various characters so as to determine a likelihood that the various characters will interact. For example, if two characters are located at a distance and their respective trajectories indicate the two trajectories will not intersect, a likelihood that the two characters will not interact can be determined thus the content segment of the one or more content segments may be associated with an interest level that does not satisfy the interest level threshold. Likewise, if the trajectories of two characters indicate their paths will cross, a high likelihood that the two characters will interact may be determined and thus, the content segment of the one or more content segments may be associated with interest level that satisfies the interest level threshold. If, in a given content segment of the one or more content segments it is determined that two characters are likely to interact or are interacting, that content segment can be associated with an interest level that satisfies the interest level threshold.

At step 606, the content and the data may be sent to a computing device. The data may facilitate storing the one or more content segments as described herein. For example, the data may facilitate the computing device storing the one or more content segments in the storage 112.

For example, as described with reference to FIG. 2A, a content segment received by the content server 108 may be labeled as satisfying the interest level threshold. The content server 108 may determine, based on the label that the content segment is to be maintained in the storage. Similarly, a content segment received by the content server 108 may be labeled as not satisfying the interest level threshold and therefore, the content server 108 may determine, based on the label that the content segment is not to be maintained in the storage and thus never enters the storage 112.

For example, as described with reference to FIG. 2B, the one or more content segments may be stored in the storage 112, wherein it may be determined that a first content segment is associated with an interest level which satisfies the interest level threshold while a second content segment is determined to be associated with an interest level that does not satisfy the interest level threshold. The content server 108 may execute a function to remove the second content segment (that does not satisfy the interest level threshold) from the storage 112.

For example, as described with reference to FIG. 2C, the content server 108 may determine a first content segment that is associated with an interest level that satisfies the interest level threshold. This first content segment may be designated for output (for example, to the user device 103A). Meanwhile, the content server 108 may determine a second content segment that is associated with an interest level that fails to satisfy the interest level threshold. This second content segment may be designated as a content segment which is not to be output to a user device (e.g., the user device 103A).

For example, as described with reference to FIG. 2D, the content server 108 may label a content segment associated with an interest level that satisfies the interest level with an instruction to be received and read by a user device (e.g., the user device 103A) that instructs the user device to display (e.g., "play") the content segment. Likewise, the content server 108 may label a content segment associated with an interest level that fails to satisfy the interest level with an instruction to be received and read by a user device (e.g., the user device 103A) that instructs the user device to not display (e.g., "skip") the content segment.

An interruption event associated with an output of content may be determined. The interruption event may occur at a first and output of the stored portion of the video data may be caused. A termination of the interruption event may be determined. A message may be sent to the computing device based on the termination of the interruption event. Output of the stored portion may be caused based on the termination of the interruption event.

Figure 7:
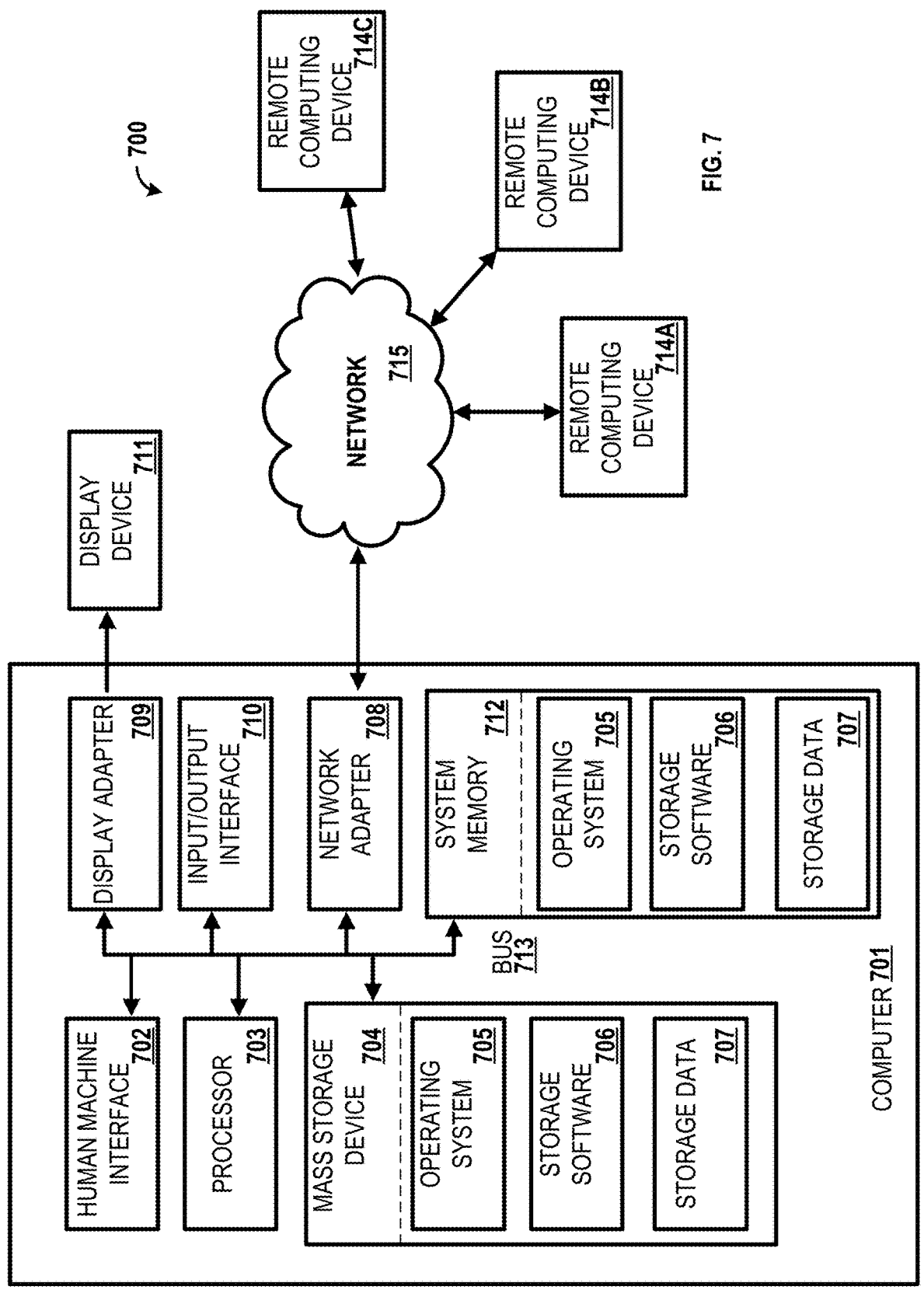
FIG. 7 is a block diagram of an example computing device.

The above described disclosure may be implemented on a computer 701 as illustrated in FIG. 7 and described below. By way of example, game server 104 of FIG. 1 can be a computer as illustrated in FIG. 7. Similarly, user device 102 and storage 112 may be a computer as illustrated in FIG. 7. Likewise, the game server 104, the user device 102, or the storage 112 may be a remote computing device (e.g., remote computing devices 714A, 714B, or 714C) of FIG. 7. FIG. 7 is a block diagram illustrating an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the example operating environment.

The present disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Examples comprise set top boxes, programmable consumer electronics, network PCs, minicomputers, mainframe computers, distributed computing environments that comprise any of the above systems or devices, and the like.

The processing of the disclosed can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. 703. The system can utilize parallel computing.

The system bus 713 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 713, and all buses specified in this description can also be implemented over a wired or wireless network connection and each of the subsystems, including the one or more processors 703, a mass storage device 704, an operating system 705, storage software 706, storage data 707, a network adapter 708, the system memory 712, an Input/Output Interface 710, a display adapter 709, a display device 711, and a human machine interface 702, can be contained within one or more remote computing devices 714A, 714B, 714C at physically separate locations, connected through buses of this form, in effect implementing a fully distributed system.

The computer 701 typically comprises a variety of computer readable media. Example readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the storage data 707 and/or program modules such as the operating system 705 and the storage software 706 that are immediately accessible to and/or are presently operated on by the one or more processors 703.

The computer 701 can also comprise other removable/non-removable, volatile/non-volatile computer storage media. By way of example, FIG. 7 illustrates the mass storage device 704 which can facilitate non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the storage software 706. Each of the operating system 705 and the storage software 706 (or some combination thereof) can comprise elements of the programming and the storage software 706. The storage data 707 can also be stored on the mass storage device 704. The storage data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The user or device can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

The display device 711 can also be connected to the system bus 713 via an interface, such as the display adapter 709. It is contemplated that the computer 701 can have more than one display adapter 709 and the computer 701 can have more than one display device 711. For example, the display device 711 can be a monitor, an LCD (Liquid Crystal Display), or a projector. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714A, 714B, 714C. By way of example, a remote computing device can be a gaming system, personal computer, portable computer, smartphone, a server, a router, a network computer, a peer device or other common network node, and so on. Logical connections between the computer 701 and a remote computing device 714A, 714B, 714C can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the one or more processors 703 of the computer. An implementation of the selective storage software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The disclosure can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the disclosure has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as an example only, with a true scope and spirit being indicated by the following claims.

What is claimed is:

1. A method comprising:
   causing, by a computing device, output of content associated with an interruption event associated with output of a content stream;
   determining, based on data associated with the output of the content stream, a portion of the content stream that otherwise would have been output during the interruption event, that satisfies an interest level threshold;
   after the output of the content associated with the interruption event, causing output of the portion of the content stream; and
   after the output of the portion of the content stream, causing the output of the content stream to resume.

2. The method of claim 1, wherein the interruption event comprises at least one of: a video interruption, a replay event, a commentary event, an Amber Alert, an Emergency Alert System (EAS) announcement, a content trigger, a noteworthy event/action occurring in video content, a breaking news event, a political address, a network interruption, a service interruption, a software failure, or a hardware failure.

3. The method of claim 1, wherein determining, based on the data associated with the output of the content stream, the portion of the content stream that satisfies the interest level threshold comprises:
   determining, based on data associated with a plurality of content segments of the content stream, an interest level associated with each content segment of the plurality of content segments; and
   determining, based on the interest level associated with each content segment of the plurality of content segments, one or more content segments of the plurality of content segments that satisfy the interest level threshold.

4. The method of claim 3, wherein the data associated with each content segment of the plurality of content segments comprises at least one of: game actions, game statistics, or game information.

5. The method of claim 1, wherein the interest level threshold is associated with at least one of: game actions, game statistics, or game information.

6. The method of claim 1, further comprising determining at least one of: a pause in an audio stream or a change in a view of a video stream.

7. The method of claim 1, wherein causing the output of the portion of the content stream comprises removing from storage any content segments of the content stream that do not satisfy the interest level threshold.

8. The method of claim 1, further comprising storing the portion of the content stream that satisfies the interest level threshold.

9. The method of claim 1, wherein the portion of the content stream that otherwise would have been output during the interruption event comprises a portion of the content stream that continues to be received during the interruption event and not output.

10. A method comprising:
  determining data associated with a content stream, wherein the data is configured to cause a determination of one or more interest levels for one or more portions of the content stream;
  sending, to a computing device, the content stream and the data, wherein the data facilitates storing a portion of the one or more portions of the content stream based on the one or more interest levels;
  after output of content associated with an interruption event associated with output of the content stream, causing output of the portion of the one or more portions of the content stream; and
  after the output of the portion of the one or more portions of the content stream, causing the output of the content stream to resume.

11. The method of claim 10, wherein the data comprises at least one of: game information, game statistics, or game actions.

12. The method of claim 10, wherein the data comprises content information.

13. The method of claim 10, wherein sending the content stream and the data to the computing device comprises sending one or more data streams.

14. The method of claim 10, wherein causing the output of the portion of the one or more portions of the content stream comprises removing from storage any content segments of the content stream that do not satisfy an interest level threshold.

15. An apparatus comprising:
  one or more processors; and
  memory storing processor-executable instructions that, when executed by the one or more processors, cause the apparatus to:
    cause output of content associated with an interruption event associated with output of a content stream;
    determine, based on data associated with the output of the content stream, a portion of the content stream that otherwise would have been output during the interruption event, that satisfies an interest level threshold;
    after the output of the content associated with the interruption event, cause output of the portion of the content stream; and
    after the output of the portion of the content stream, cause the output of the content stream to resume.

16. The apparatus of claim 15, wherein the processor-executable instructions, that when executed by the one or more processors, cause the apparatus to determine, based on the data associated with the output of the content stream, the portion of the content stream that satisfies the interest level threshold, further cause the apparatus to:
  determine, based on data associated with a plurality of content segments of the content stream, an interest level associated with each content segment of the plurality of content segments; and
  determine, based on the interest level associated with each content segment of the plurality of content segments, one or more content segments of the plurality of content segments that satisfy the interest level threshold.

17. The apparatus of claim 15, wherein the processor-executable instructions, when executed by the one or more processors, further cause the apparatus to store the portion of the content stream that satisfies the interest level threshold.

18. An apparatus comprising:
  one or more processors; and
  memory storing processor-executable instructions that, when executed by the one or more processors, cause the apparatus to:
    determine data associated with a content stream, wherein the data is configured to cause a determination of one or more interest levels for one or more portions of the content stream;
    send, to a computing device, the content stream and the data, wherein the data facilitates storing a portion of the one or more portions of the content stream based on the one or more interest levels;
    after output of content associated with an interruption event associated with output of the content stream, cause output of the portion of the one or more portions of the content stream; and
    after the output of the portion of the one or more portions of the content stream, cause the output of the content stream to resume.

19. The apparatus of claim 18, wherein the data comprises at least one of: game information, game statistics, or game actions.

20. The apparatus of claim 18, wherein the processor-executable instructions, that when executed by the one or more processors, cause the apparatus to cause the output of the portion of the one or more portions of the content stream, further cause the apparatus to remove from storage any content segments of the content stream that do not satisfy an interest level threshold.

* * * * *